United States Patent Office
3,389,114
Patented June 18, 1968

3,389,114
ORGANOPOLYSILOXANE RESINS
AND PROCESS
Alfred J. Burzynski and Robert E. Martin, Toledo, Ohio, assignors to Owens-Illinois, Inc., a corporation of Ohio
No Drawing. Continuation-in-part of application Ser. No. 370,684, May 27, 1964. This application Aug. 14, 1967, Ser. No. 660,223
18 Claims. (Cl. 260—32.8)

ABSTRACT OF THE DISCLOSURE

An organopolysiloxane resin is prepared under particular conditions from a methyltrialkoxysilane represented by the formula

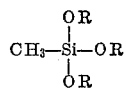

wherein R represents an alkyl radical containing less than 4 carbon atoms. Methyltriethoxysilane is preferred. Optionally there may be included in the reaction mass from 0 to about 5.0 mole percent, based on total silane reactant material, of at least one compound different from the above-described methyltrialkoxysilane and which is represented by the formula

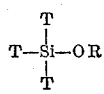

wherein R in the alkoxy radical—OR has the same meaning as in the first-given formula and each T independently represents an aryl, alkyl or alkenyl radical, each of which contains less than 7 carbon atoms, or the aforementioned alkoxy radical,—OR. The reaction mixture contains at least the stoichiometrical amount of water required for complete hydrolysis and condensation of the siloxane precursor (see Equations III, IV and V), e.g., from about 1.5 to 10 moles H₂O per mole of said precursor. An acidity limitation on the initial reaction mixture also is described.

Particular conditions are set forth for (a) heating the reaction mixture to form the initial liquid "siloxane partial condensation product;" (b) for concentrating this product; (c) for precuring the concentrated liquid product; and (d) for final cure of the precured partial condensation product to obtain a solid, thermoset organopolysiloxane resin.

Products of the invention include organic solvent-soluble, siloxane partial condensation products useful, for example, as components of coating compositions or as molding compositions that can be molded to provide thermoset molded articles. The liquid partial condensation products also can be cast to yield shaped, solid, relatively thick, machinable, heat-resistant, thermoset, organopolysiloxane bodies or structures.

Cross-reference to related application

This application is a continuation-in-part of our copending application Ser. No. 370,684, filed May 27, 1964 now abandoned, and assigned to the same assignee as the present invention.

The invention

The present invention relates to siloxane resins and to a process for their manufacture. More particularly this invention relates to new and novel organopolysiloxane bodies with advantageous properties including desirable optical and heat-resistant properties, and to improved methods for preparing organopolysiloxanes.

Most silanols, i.e., silicon compounds which possess one or more hydroxyl groups bonded directly to a silicon atom, tend to form thhe corresponding ether analogs (siloxanes) by an equilibrium reaction that may be envisioned as the loss of one molecule of water per two such hydroxyl groups. The reactivity of silanols, especially silanetriols, to form siloxanes is so great that high selectivity in product formation is seldom possible, and complexity of the reaction mixture often precludes identification of specific products.

The high reactivity of most silanols makes it desirable to form them in situ. This is usually accomplished by hydrolysis of precursors which contain silicon atoms attached to substituents convertible to hydroxyl groups. These hydrolyses reactions may be illustrated as

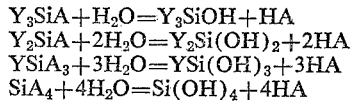

in which Y represents, for example, an organic grouping such as a hydrocarbon radical, and A represents a hydrolyzable group such as alkoxy, acyloxy, halogen, etc.

The art has recognized that siloxane formation is subject to catalysis by an acid or a base, and that control of pH is necessary to prevent uncontrollable reaction. It is also known that, among compounds of the type YSiA₃, those of the formula CH₃SiA₃ (i.e., precursors of methylsilanetriol) exhibit the fastest and least controllable rate of hydrolysis-condensation. The acute sensitivity of methylsilanetriol to acid catalysis, in general, precludes the use, as precursors, of methyltrichlorosilane, methyltriacetoxysilane, and similar derivatives that liberate acidic by-products during hydrolysis, and restricts attention mainly to methyltrialkoxysilanes. However, the methyltrialkoxysilanes are also subject to premature gel formation. Thus, according to M. M. Sprung and F. O. Guenther, J. Am. Chem. Soc., 77, 3990 (1955), "The usual total hydrolysis product of a methyltrialkoxysilane or methyltrihalosilane, so-called "T-gel," has the empirical formula $(CH_3SiO_{1.5})_n$. It is a granular, insoluble, infusible, and generally intractable solid." Work reported in the cited article on hydrolysis and condensation of methyltriethoxysilane in water-ethanol or water-benzene, optionally with added acid, led only to formation of liquids, gels, or small particles of sublimable solids believed to be low-molecular-weight products from condensation of six to twelve methylsilanetriol units. Work of the same authors with methyltrimethoxysilane, reported in J. Am. Chem. Soc. 77, 4173 (1955), gave similar results. Careful exclusion of an acid or a base has thus been recognized in the art as being particularly important when premature gel formation from methyltrialkoxysilanes was to be avoided; see, also, U.S. 2,450,594, and S. W. Kantor, J. Am. Chem. Soc., 75, 2712 (1955).

Despite the extreme difficulty of controlling hydrolysis-condensation rates of methyltrialkoxysilanes, substantial work has been expended on them because the resultant resins possess several properties unique among organopolysiloxanes. Since they have no carbon-to-carbon bonds they well transmit ultraviolet radiation, and of all organopolysiloxanes they contain the highest proportion of inorganic constitutents. See Reissue U. S. Patent No. 23,060, U.S. Patents 2,456,783, and U.S. 2,397,895, and M. M. Sprung and F. O. Gruenther, J. Am. Chem. Soc., 77, 4173, 6045 (1955). These references report several procedures suitable to convert methyltrialkoxysilanes as co-monomers with other alkoxy-silanes to a variety of useful liquid and solid organopolysiloxanes. However, none of these references nor, so far as we are aware, any published reference, teaches procedures suitable to make transparent, substantially thick, bulk articles of predetermined shape and size from methyltrialkoxysilanes as the sole or essential monomeric constituent.

Although hard and occasionally transparent films have been prepared from methyltrialkoxysilanes as comonomers with other alkoxysilanes, the procedures reported for their formation have not been alleged to be, and in our experience are not, suitable to form substantially thick, solid, siloxane bodies. Procedures for forming films are generally unsuitable for making relatively thick bodies, since the stresses established and volatiles entrapped in the interior of bulk articles during cross-linking do not accumulate to a like extent in films, probably because of their greater surface/volume ratio. We have now discovered a process that is useful for the preparation of transparent bulk articles from methyltrialkoxysilanes as the sole, essential monomeric precursor. The process has the particular advantages that its manipulative steps are conveniently rapid for commercial operation.

It is therefore an object of the present invention to provide new organopolysiloxane resins as well as a method of producing such resins.

It is another object to provide a method for producing solid, relatively thick, strong organopolysiloxane bodies.

It is a further object to provide a method for producing relatively thick, heat-resistant, solid, organopolysiloxane bodies of pre-selected dimensions.

It is a still further object to provide an improved method for forming solid methylorganopolysiloxanes.

Another object of the invention is to provide organic solvent-soluble organopolysiloxane resins (i.e., siloxane partial condensation products) both in liquid and solid form, and a method of making such resins. Such resins are useful, for example, in making coating compositions, as casting resins, and as solid, thermosetting (heat-softenable) molding compositions from which thermoset molded articles can be made.

These and other objects and advantages of the present invention will become evident from the following description.

According to the present invention there is provided a method of preparing a solid resin by (1) heating a mixture of (a) a methyltrialkoxysilane of the formula I 

wherein R represents an alkyl radical of less than 4 carbon atoms and from 0 to about 5 mole percent, based on total silane reactants, of at least one compound different from the above-described methyltrialkoxysilane and which is represented by the general formula II 

wherein R is the alkoxy radical —OR has the same meaning as in Formula I and each T independently represents a monovalent hydrocarbon radical selected from the group consisting of aryl, alkyl, and alkenyl radicals, each of which contains less than seven carbon atoms, and the alkoxy radical, —OR, and (b) from about 1.5 to 10 moles of water per mole of silane, for at least one hour and up to ten hours at temperatures of at least about 40° C., preferably at least about 50° C. while retaining at least 1.5 mole of alkanol by-products in said mixture per mole of silane starting material assuming complete hydrolysis of all alkoxy-silicon linkages in the silane reactant material in the said mixture of (1); and (2) gradually raising the temperature of the resultant mixture to a final temperature of from 65° to 300° C. (more particularly from 70° to 150° C.) while gradually removing by volatilization alkanol by-products and some water, over a time interval of at least 5 minutes, and continuing condensation and heating in the range of from about 70° to 300° C. (more particularly from about 90° or 100° C. to 220° C.) for a time short of solid or gel formation in said temperature range.

Methyltrialkoxysilanes used in practicing the present invention are those of the formula $CH_3Si(OR)_3$ wherein each R represents an alkyl radical with less than four (i.e., one to three) carbon atoms. Included are methyltrimethoxysilane, methyltriethoxysilane, methyltri-n-propoxysilane, and methyltriisopropoxysilane, as well as compounds with mixed alkoxy groups. Examples of co-reactants embraced by Formula II include trimethylmethoxysilane,
tri(1-methylethyl)ethoxysilane,
di(1-methylpropyl)diethoxysilane,
divinyldipropoxysilane,
diphenyldiethoxysilane,
propylpentylmethoxyethoxysilane,
methylallyldi(1-methylethoxy)silane,
vinylphenyldimethoxysilane,
ethyltriethoxysilane,
(1-methylethyl)trimethoxysilane,
(1,1-dimethylethyl)tripropoxysilane,
hexyltriethoxysilane, and vinyltriethoxysilane.

Suitable experimentally determined variations of the time and temperature parameters of the process of this invention would probably allow use of alkoxysilanes containing longer carbon chains in the alkoxy radical. However, the greater hydrolysis time required by longer alkoxy radicals makes them undesirable, since an important aspect of the present process is the relatively short time in which it can be carried out. The comonomers embraced by Formula II can be used to modify the properties of the resins of this invention according to principles known generally to the art. Thus, comonomers containing three or four alkoxy groups act as cross-linking agents, those with two alkoxy groups act to increase chain length and decrease cross-linking, and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers above this amount can cause decreased chemical resistance and transmission of ultraviolet radiation.

The concentration of water in the initial hydrolysis-condensation reaction mixture should be in the range of from about 1.5 moles to about 10 moles of water per mole of silane reactant. Assuming methyltrialkoxysilane as the only monomer, its complete hydrolysis and condensation can be represented as III 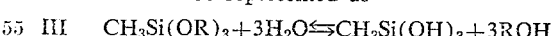

IV 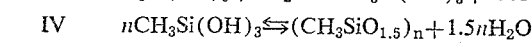

or overall

V 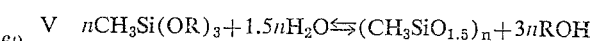

wherein $n$ represents a number corresponding to the degree of polymerization and is greater than 1. Thus the lower theoretical limit of water is 1.5 moles $H_2O$ per mole of silane. Solid organopolysiloxane resins of this invention can be prepared at this concentration, but further decrease in water content of the reaction mixture leads to polymers that are rubbery and soft, presumably due to incomplete hydrolysis whereby residual alkoxy groups are left in the partial condensation product. If the quantity of water is in the range of about 1.5 moles to 5 moles of water per mole of silane monomer, the alkanol by-product formed during hydrolysis acts as a solvent for the other products and reactants, and the initially heterogenous reaction mixture becomes clear and homogeneous. This homogeneity allows more uniform control of resin formation. If the water:silane ratio substantially exceeds 5:1, the alkanol formed is insufficient to convert the aqueous medium to a solvent for the reactants and products, and resin precipitation can occur. Insolubility of resinous products at higher water concentrations can be overcome by adding a water-miscible organic solvent such as ethanol, etc. However, at water concentrations above about 10 moles of water per mole of silane monomer, gel formation can occur even if sufficient organic solvent is added to make the reaction mixture homogeneous. The exact upper limit of the water:silane ratio will depend on such factors as silanes used, acid content, time and temperature, etc. Thus it cannot be set forth precisely, but can be determined by routine test in each case. The limits within which no addition of organic solvent is required, viz., from about 1.5 to about 5.0 (more particularly from 1.5 to about 3.0) moles of water per mole of silane monomer, are preferred.

At pressures near one atmosphere, temperatures in the range of from about 40° or 50° C. to the reflux temperature of the mixture are useful. Temperatures much below this range require substantially longer times for reaction, but are not precluded, e.g., 20° or 30° C., in which case the time of reaction may be as much as 10 hours or more. No property advantages seem to accrue from the use of such lower temperatures. In general, temperatures at or near the reflux temperature of the reaction mass are preferred, particularly when reflux occurs at 65° to 100° C., more particularly 70° to 90° C. Under the concentration and temperature conditions described, the initial hydrolysis and condensation are complete after from about one to ten hours, depending on the particular materials and conditions used, with from two to four hours being typical.

Some alkanol by-product must be retained in the reaction mixture during initial hydrolysis and condensation. It is believed that the alkanol, by mass action (see Equations III, IV and V, supra), slows the overall rate of hydrolysis and thus, indirectly, condensation. This control of the rate of resin formation prevents premature gel formation and allows the preparation of highly cross-linked polymers with good dimensional stability. If the by-product alkanol concentration is allowed to fall substantially below 1.5 moles of alkanol per mole of silane monomer (assuming complete hydrolysis as indicated in the above-mentioned equations), gel formation occurs. This limit can vary slightly with the particular conditions and materials used.

After initial hydrolysis and condensation under the conditions just described, and after controlled volatilization of alkanol by-products and water is effected, the temperature of the mixture is raised to temperatures within the range of from 70° to 300° C., which is herein designated the precure step. The purpose of the precure is to effect controlled removal of the remaining volatiles while siloxane condensation continues at a convenient rate but slowly enough to avoid gel formation.

Depending upon the end use, for instance in casting applications, the highest possible precure temperature generally is preferred, since this provides greatest impetus to siloxane formation and volatilization of alkanol and water, and allows the shortest time to effect final cure at lower temperatures. The temperature to which a particular mixture can be heated during precure (i.e., in forming a prepolymer) without causing gelation depends upon the materials used and their prior treatment, but the limit can be readily established by heating an aliquot to gelation and keeping the precure temperature of the main batch below this gelation point. (When testing for gel or gelation point, the time of heating with stirring should be relatively short, e.g., up to 10 minutes. Thus in a technique that has been found to be suitable for routine control operations, the gel point is recorded as that temperature at which a 50-gram sample of prepolymer gels when placed in a 100-ml. beaker and stirred on a 600° F. hot plate.)

Thus, the precure step can be effected by slowly or rapidly heating the concentrated liquid siloxane partial condensation product to and at a temperature which is at least from about 10° to about 20° C., more particularly from about 30° to about 50° C., below its gel point. This maximum temperature is usually within the range of from about 140° C. to about 220° C. at ambient pressure, but may be higher or lower as desired or as particular conditions may require, e.g., within the broader range of 110° to 300° C. at ambient pressure.

The overall time of the precuring step and the time at the maximum temperature depend upon such influencing factors as, for example, the particular heating means employed, the volume and form (e.g., in bulk or as a film) of the liquid organopolysiloxane being heated, the amount of water in the liquid resin, and the degree of pre-curing that is desired. The overall time may be, for example, from about one minute (or even less) to one or more hours, or even days or weeks if temperatures of the order of only about 80° to 100° C., or slightly above, are employed. At higher temperatures close to the gelation point of the liquid resin, the time at the maximum temperature may be only momentary (e.g., a second or less) up to one or two minutes or more when it is desired to effect precuring as quickly as possible without gelation.

[Terms such as the aforementioned "liquid siloxane partial condensation product," "liquid organopolysiloxane," "liquid resin," and the like, as used herein and/or in the appended claims, are intended to include within their meanings, unless it is clear from the context that a different meaning is intended, compositions wherein the siloxane partial condensation product, the organopolysiloxane, or the resin (as it may be designated in the particular instance), are in solution state; for example, in solution in a mixture of water and by-product alkanol, with or without other added solvent, or dissolved in a single organic solvent or a mixture of organic solvents, which may be miscible or immiscible with water. Examples of such organic solvents are given later herein.]

Precuring can be carried out so that the product is a liquid, organic solvent-soluble, organopolysiloxane suitable for use as, for instance, a casting resin, or as a coating, potting, adhesive or similar composition, or as a component of such compositions. Alternatively, precuring of the liquid siloxane partial condensation product can be continued to the point where, upon cooling, a solid, heat-softenable, solvent-soluble siloxane partial condensation product is obtained that can be converted upon further curing (as by heating) from a thermosetting (including potentially thermosetting) organopolysiloxane resin to one that is substantially fully cured or thermoset. For instance, such a solid, thermosetting, organopolysiloxane resin can be obtained as an intermediate product during the low-temperature curing of a concentrated liquid siloxane partial condensation product that has been cast into a mold.

To avoid gelation and effect polysiloxane formation at a conveniently rapid rate, the acidity of the initial hydrolysis-condensation reaction mixture must be maintained within certain limits hereinafter set forth in detail. Commercial alkoxysilane monomers usually contain a quantity of acid in excess of the relatively narrow limits allowable in this initial reaction mixture. Impure monomers can be used in the hydrolysis reaction mixture, followed by the addition of base to adjust the acidity to the required level, but the large amounts of salts which are often formed impair desirable properties, particularly transparency, of the final products. Salts, especially those of variable-valence cations, may also act as catalysts for siloxane formation. It is therefore preferable to adjust the acidity (calculated as HCl) of the monomer(s) to zero parts HCl per million parts monomeric material before preparing the reaction mixture. Simple distillation is unsuitable because it increases the acidity of the monomer, probably by oxidation of some organic groups to acidic or potentially acidic functions such as carboxylic acids, esters, aldehydes, and ketones. Use of an inert atmosphere, such as nitrogen, during distillation is insufficient to prevent this acidity increase, apparently because the system itself contains oxidizing species. Reduction of acid content can be carried out by adding bases such as metal hydroxides or amines, but the salts formed are objectionable impurities in the final products.

A preferred means is distillation from admixture with a reagent that will convert acidic species that are present to non-volatile compounds. Thus, distillation of the monomer(s) from admixture with alkali-metal alkoxides such as sodium ethoxide or methoxide or aqueous dilute alkali or aqueous alkali-metal carbonate is usually suitable. The methods involving aqueous media are of less advantage when the monomer contains silicon-bonded methoxyl groups, because these species hydrolyze rapidly, causing substantial quantities of monomer to be lost during purification. It has also been found that some commercial monomers initially treated by this procedure to give materials of suitably low acidity later increase in acidity during hydrolysis, causing gelation. It is believed that small quantities of acyloxysilane groups formed during commercial preparation of the monomer are responsible for this increase in acidity during hydrolysis. Thus, traces of methyldiethoxyacetoxysilane may be present in commerical methyltriethoxysilane, giving rise to undersirable quantities of acetic acid during hydrolysis as illustrated by the following equation:

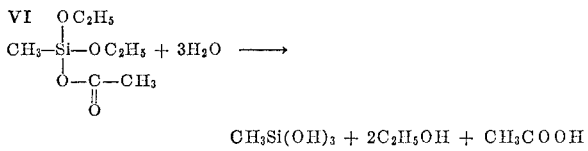

$$CH_3Si(OH)_3 + 2C_2H_5OH + CH_3COOH$$

A particularly preferred method of purification that avoids these difficulties is distillation over lithium hydride.

It will be apparent that the actual nature of the various acidic species in commercial methyltrialkoxysilanes and their reaction mixtures cannot always be specified. As a matter of convenience the acidity of the monomeric material, when it is being tested, is expressed herein as parts by weight of HCl per million parts by weight of methyltrialkoxysilane (or of other starting silane reactant material), but this does not imply that HCl is the only or even one of the acidic species present. The acid content of the monomer was measured as follows:

To 25 ml. of toluene was added 13 drops of a 0.04% methanol solution of bromcresol purple, and the resultant mixture was titrated to a blue-violet endpoint with 0.02 N potassium hydroxide. A 10.0 ml. sample of methyltrialkoxysilane was pipetted into the solution thus obtained, and the resultant mixture was titrated to the same blue-violet endpoint with 0.02 N potassium hydroxide. The weight of a 10-ml. sample was independently determined. Under these conditions, acidity is calculated as $$A = 729V/S$$

where A is acid content in parts by weight (grams) of HCl per million parts by weight (grams) of methyltrialkoxysilane (assuming that the entire sample is the silane), V is the volume of alkali used in the second titration described, and S is the weight of the sample in grams.

The initial hydrolysis-condensation reaction is conveniently carried out by placing in a suitable vessel pure water and methyltrialkoxysilane, the acid content of this mixture being suitably adjusted by one of the means hereafter described. Optionally up to about 5 mole percent, based on the total hydrolyzable silanes, of one or more compounds of the formula $T_3SiOR$ as previously defined, also purified if necessary, may be added. The resultant mixture is then heated under reflux. The initially cloudy reaction mixture clears on heating, usually within an hour, because alcohol formed as a hydrolysis by-product dissolves the other components of the mixture. A suitable degree of hydrolysis-condensation is usually obtained if reflux is allowed to proceed for about one to four hours after the mixture has cleared. This step can be carried out at lower temperatures, but the rate is slower.

The upper limit of permissible acid content during this initial hydrolysis-condensation is that beyond which gel formation occurs. The lower limit is determined by the desired reaction time. In general, the minimum reaction time to obtain satisfactory products is about one hour of reflux.

Maximum and minimum allowable acid contents vary with the ratio of methyltrialkoxysilane and water used. The lower theoretical water content is $Z/2$, where Z is the average number of alkoxy groups attached to silicon throughout the mixture. Thus when methyltrialkoxysilane is the sole silane constituent, the theoretical lower molar ratio of silane:water is 1:1.5. When the molar silane:water ratio is 1:1.5, the minimum allowable acid content is about 50 parts HCl per million parts of total methyltrialkoxysilane and water, and the maximum is about 650 parts HCl on this same basis. When the molar silane:water ratio is 1:3.0, the minimum allowable acid content is about "zero" parts HCl per million parts of total methyltrialkoxysilane and water, and the maximum is about 5 parts HCl on this same basis. By "zero" parts HCl just mentioned, it is not intended to imply that no acid whatsoever is present. It simply means that, by the test method used, no titratable acid could be detected when in fact some slight amount of acid (perhaps as little as 0.1 to 0.01 part, or even less, calculated as HCl) was present in the reaction mixture comprised of water and silane monomer(s). The presence of at least a slight, positive amount of acid in the reaction mixture has been found to be highly desirable in order to "trigger" the start of the reaction and to decrease the initial hydrolysis-condensation reaction time.

These limits have been carefully established but are necessarily subject to minor variation in each case, for several reasons. First, polymer formation may not proceed identically in any two runs, and the acid sensitivity of the system may vary. Second, use of other alkoxysilanes as comonomers in amounts previously specified can vary acid sensitivity. Third, extremely small quantities of impurities in a given sample, impractical to remove, can alter acid sensitivity slightly. These factors, however, affect only the maximal and minimal extremes of allowable acid content, and the major portion of the suitable area indicated will be unchanged.

It is usually most convenient to reduce the acid content of the monomers to about zero part by weight of HCl per million parts of monomer by one of the methods previously described, and if necessary adjust the acidity of the initial reaction mixture by adding acid in the water used. Although generally any acidic material soluble in the reaction mixture can be employed, including organic acids such as phenol and formic acid, a mineral acid, specifically hydrochloric acid, is generally used and is preferred.

The reaction mixture from the initial hydrolysis-condensation is concentrated by removing volatile component, conveniently by distillation from the vessel containing the reaction mixture. All of the solvents (i.e., water and by-product alkanol) should not be removed or the resin will have a pronounced tendency to gel. Usually removal of about 80 mole percent of the alkanol by-product gives a residue convenient to manipulate further by the particular means herein described. The concentrate thus obtained is next heated as hereinbefore described, e.g., to a temperature above the boiling point of pure water at the prevailing pressure for a specified time, conveniently while stirring in an open vessel, e.g., a beaker in laboratory preparations. The time and temperature of this precure step have been discussed hereinbefore. The elimination of water and other volatile materials from the reaction mixture at this point presumably leads to further polymerization, and the mixture becomes increasingly viscous. If the precure step is omitted from the process, cast resins will crack severely during the final curing step.

Additives that are substantially chemically inert under the reaction conditions can be added to obtain desired variations in properties. Fillers such as silica, unreactive organosilanes, and clays are suitable. Coloring agents such as alcohol or water-soluble dyes or insoluble pigments can be added to the reaction mixtures of the present invention to give organopolysiloxane bodies of the type described and which are also colored. The resulting products are useful as colored light filters. The quantity of dye or pigment and the most advantageous point of its addition will depend on the particular coloring agent used, and the desired color of the product. These variables are therefore best determined by routine test.

After casting in molds, a final cure can be carried out at room (ambient) temperature or lower, simply by allowing the cast resin to stand, and commercially this may be attractive since no heat-treatment cost is involved.

A more convenient procedure involves heating the precured, cast resin at about 90° C. for about three days. An especially strong product can be obtained if the precured resin, cast in an aluminum foil-lined mold, is heated at about 90° C. until firm (i.e., until it becomes a gel or gel-like semi-solid or solid), allowed to cool to room temperature, cooled to about 0° C., removed in hardened state from the mold, and replaced, inverted, in the 90° C. oven until hard. This preferred heat treatment evidently reduces stresses in the final product, that is, in the thermoset or substantially fully cured product.

From the foregoing it will be seen that there is provided a firm, solid, further-curable organopolysiloxane as an intermediate product. Such organopolysiloxanes are thermosetting, organic solvent-soluble resins that can be used, for example, as components of coating compositions or as molding compositions to yield thermoset coatings and molded articles when substantially fully cured as by heat along, or by both heat and pressure, and/or catalytic influences.

The final stages of cure can also be effected at temperatures above 100° C. after the 90° C. cure has brought the resin to a substantially hard condition.

The resinous product of the precure step is soluble in water-miscible organic solvents such as ethanol, acetone, Cellosolve (glycol monoethyl ether) and tetrahydrofuran; and in water-immiscible solvents, e.g., methylene chloride, ethylene dichloride, nitrobenzene and aniline. The resultant solutions have prolonged storage life before gelation occurs, and their stability increases with decreasing temperature and resin concentration. Storage life is prohibitively short if the solution contains more than about 90 weight percent resin. A lower limit to resin concentration is set only by convenience, since storage and subsequent removal of solvent from extremely dilute solutions is generally commercially unfavorable. These solutions, usually containing about 50 weight percent resin solids, can be evaporated to a move viscous stage and used as molding materials by the further curing steps already described. They can also be employed as film-forming materials, e.g., in coating applications, by spraying, brushing, or other means known to the art. The thickness of the resultant films can, of course, be controlled by varying the concentration of the resin solution and the number of layers applied. The resulting coatings can be cured by heating. However, because of the thinness of a film they can be heated more rapidly than the molded resin to a maximum temperature of, for example, about 250° C. These films are useful, for example, as water-, weather- and abrasion-resistant coatings, and as electrical insulation. It will be understood that the processes of this invention to prepare solid organopolysiloxane bodies are, in general, also applicable to the formation of such films. The final, cured products are substantially solid and possess a high degree of crosslinking, since they are substantially insoluble in organic solvents such as benzene and toluene.

The following examples are illustrative, and should not be construed as limiting the invention.

Example 1

(A) A sample of commercial methyltriethoxysilane (MTES) was distilled from lithium aluminum hydride, and the distillate at 140° to 141° C. was collected. A mixture of 143 ml. (0.75 mole) of the MTES thus obtained, 20 ml. (1.11 moles) of distilled water, and 2 weight parts HCl per million parts of total MTES and water (hereafter often abbreviated as "p.p.m. hydrochloric acid" or "p.p.m. HCl") was heated and stirred under reflux until the initially two-phase system had cleared (about 20 minutes), and then for an additional four hours. At the end of this time about 100 ml. (about 78% of the theoretical amount) of by-product ethanol was distilled off, and the distillation residue (a concentrated liquid methylsiloxane partial condensation product) was poured into a beaker and heated for about one minute at 140° C. with stirring to effect precure. The material thus obtained was poured into an aluminum foil-lined mold, two inches in diameter and about ¾ inch deep, to a depth of about ½ inch. The molded sample was cured by heating at 90° C. for three days, cooled to about 0° C. and removed from the mold. Thereafter, it was additionally cured at 90° C. for four days to give a clear, flexible, substantially solid disk about two inches in diameter and one-half inch thick. Similar runs were made using increased acid concentrations and precure temperatures up to 300° C. As acid concentrations approached about 700 p.p.m. HCl, the final products became increasingly cloudy and soft. An acid content of about 700 p.p.m. HCl is believed to represent the limit at which hard, substantially transparent resins can be formed at a silane to water mole ratio of 1 to about 1.5.

(B) The procedure of Example 1–A was repeated using 143 ml. (0.75 mole) of purified MTES, 27 ml. (1.5 moles) of distilled water, and an acid concentration of 2 p.p.m. hydrochloric acid. After initial hydrolysis, concentration, and precure as previously described, a sample was poured into a mold and cured by heating at 90° C. for three days to give a hard, transparent resin. Similar samples were successfully prepared using the materials and conditions just described, except that acid concentrations of 4 p.p.m., 10 p.p.m., 21 p.p.m., 42 p.p.m., and 86 p.p.m. HCl were used. In each case a hard, transparent siloxane body was obtained. As acid concentration exceeds about 130 p.p.m. HCl, the limit of precure temperature rapidly drops because of gelation. Thus, a sample containing 160 p.p.m. HCl gelled when heated to 105° C. during the precure stage. An acid content of 130 p.p.m. HCl is believed to represent the limit at which hard, substantially transparent resins can be formed at a silane to water mole ratio of 1 to about 2.

(C) The procedure of Example 1–A was repeated using 143 ml. (0.75 mole) of purified MTES, 34 ml. (1.89 moles) of water, and 10 p.p.m. HCl. After initial hydrolysis, concentration, and precure as previously decribed, a sample was poured into a mold and cured by heating at 90° C. for two days to give a hard, transparent resin. Similar samples were successfully prepared using the materials and conditions just described, except that acid concentrations of 20 p.p.m. and 42 p.p.m. HCl were used. In each case a hard, transparent, siloxane body was obtained. As acid concentration exceeds about 80 p.p.m. HCl, the limit of precure temperature rapidly drops because of gelation. Thus a sample containing 83 p.p.m. HCl began to gel at 150° C., and a sample containing 160 p.p.m. HCl gelled at 95° C., and could not be precured. An acid content of 80 p.p.m. HCl is believed to represent the limit at which hard, substantially transparent resins can be formed at a silane to water mole ratio of 1 to about 2.5.

(D) The procedure of Example 1–A was repeated using 143 ml. (0.75 mole) of purified MTES, 41 ml. (2.28 moles) of distilled water, and 1 p.p.m. HCl. After initial hydrolysis, concentration, and precure as previously described, a sample was poured into a mold and cured by heating at 90° C. for three days to give a hard, transparent resin. Further runs showed that good products could be prepared using slightly higher acid concentrations, but the limit of precure temperature was 110° C., at 2 p.p.m. HCl; 115° C. at 4 p.p.m. HCl; 120° C. at 20 p.p.m. HCl; and 105° C. at 40 p.p.m. HCl Although precure can be effected at these temperatures only slightly above 100° C., the final products are in general softer and more rubbery than those which have been precured at higher temperatures. Thus an acid content of about 5 p.p.m. HCl is believed to represent the limit at which hard, substantially transparent resins can be formed at a silane to water mole ratio of 1 to about 3.

(E) A reaction mixture was prepared using 143 ml. (0.75 mole) of purified MTES, 135 ml. (7.5 moles) of water, and an acid concentration of 1 p.p.m. HCl. The resultant two-phase mixture was heated under reflux for four hours, after which 100 ml. of alcohol was distilled off. The distillation residue was poured into a beaker and stirred with additional heating in an attempt to effect precure. The resinous mixture gelled at 95° C., and precure could not be carried out. The mole ratio 1:10 of silane:water here employed thus represents the approximate upper limit for the procses of the present invention.

Example 2

A sample of commercial MTES was distilled from its admixture with aqueous sodium carbonate, and the distillate at 140° to 141° C. was collected. A mixture of 143 ml. (0.75 mole) of the MTES thus obtained, 41 ml. (2.28 moles) of distilled water, and 50 p.p.m. HCl was heated and stirred under reflux for one-half hour. Thereafter 100 ml. of by-product (side-product) ethanol was distilled off. When the distillation residue was heated to effect precure, it gelled at 92° C. Samples similarly prepared using longer reflux times gelled at the temperatures indicated when precure was attempted; one hour reflux, gelled at 95° C.; two hours reflux, gelled at 97° C.; and three hours reflux, gelled at 100° C. Thus the approximate lower limit of condensation-hydrolysis before alkanol is removed is about four hours.

Example 3

A sample of commercial MTES was distilled over lithium aluminum hydride, and the distillate at 140° to 141° C. was collected. A mixture of 143 ml. (0.75 mole) of the methyltriethoxysilane thus obtained, 36 ml. (2 moles) of distilled water, and 1 p.p.m. HCl was heated and stirred under reflux for four hours. At the end of this time about 100 ml. of by-product ethanol was distilled off, and the distillation residue was poured into a beaker and heated for about one minute at 120° C. with stirring to effect precure. The liquid resinous material thus obtained was then diluted with acetone to give a solution ocntaining about 50% methylpolysiloxane by weight. This solution could be stored for several weeks in a sealed container without gelation. The acetone was allowed to evaporate, and the residue was heated to 90° C. and then poured into an aluminum foil-lined mold, two inches in diameter and ¾ inch deep, to a depth of about ½ inch. The molded sample was cured at 90° C. for one day, cooled to about 0 °C., removed from the mold, and additionally cured at 90° C. for three days to give a clear, hard disk about two inches in diameter and one-half inch thick.

Example 4

A sample of commercial MTES was distilled over lithium aluminum hydride, and the distillate at 140° to 141° C. was collected. A mixture of 143 ml. (0.75 mole) of the MTES thus obtained, 20 ml. (1.11 moles) of distilled water, and 2 weight parts per million HCl was heated and stirred under reflux until the initially two-phase system cleared, and then for an additional four hours. Thereafter about 100 ml. of by-product ethanol was distilled off. About 0.5 gram of a scarlet alcohol-soluble dye was added to the liquid distillation residue, and the colored resinous mixture thus obtained was poured into a beaker and heated for about one minute at 140° C. to effect precure. The precured liquid resin was poured into an aluminum foil-lined mold, two inches in diameter and about ¾ inch deep, to a depth of about ½ inch. The colored, molded sample was cured at 90° C. for three days, cooled to about 0° C., removed from the mold, and additionally cured at 90° C. for four days to give a clear, scarlet, solid disk about two inches in diameter and one-half inch thick. Further runs were made using other dyes with similar results.

Example 5

(A) A sample of commercial MTES was distilled from admixture with saturated aqueous sodium carbonate, and the distillate at 140° to 141° C. was collected. A sample of phenyltriethoxysilane (PTES) was similarly purified. A mixture of 135 ml. (0.71 mole) of MTES, 9 ml. (0.036 mole) of PTES, 34 ml. (1.89 moles of distilled water, and 40 p.p.m. HCl was heated and stirred under reflux for four hours. At the end of this time about 100 ml. of by-product ethanol was distilled off. The distillation residue was poured into a beaker, and heated and stirred at 140° C. for about one minute to effect precure. The resulting liquid, precured resin was poured into an aluminum foil-lined mold, two inches in diameter and about ¾ inch deep, to a depth of about ½ inch. The molded sample was cured at 90° C. for four days, cooled to about 0° C., removed from the mold, and additionally cured at 90° C. for four days to give a clear, solid disk about two inches in diameter and one-half inch thick.

(B) A sample of commercial MTES was distilled from admixture with saturated aqueous sodium carbonate, and the distillate at 140° to 141° C. was collected. A sample of PTES was simiiarly purified. A mixture of 135 ml. (0.71 mole) of MTES, 9 ml. (0.036 mole) of PTES, 17 ml. (0.895 mole) of water, and 625 p.p.m. HCl was heated and stirred under reflux for about four hours. Thereafter 100 ml. of by-product ethanol was removed by distillation. The distillation residue was poured into a beaker and heated for about one minute at 140° C. with stirring to effect precure. The precured liquid siloxane partial condensation product was poured into an aluminum foil-lined mold, two inches in diameter and about ¾ inch deep, to a depth of about ½ inch. The molded sample was cured at 90° C. for three weeks to give a cloudy, substantially opaque, solid disk.

In the foregoing B portion of this example the mole ratio of water to total silane reactant material was 1.20 to 1. The example illustrates the markedly inferior quality of the product that is obtained at such a low water:silane ratio and at an acidity of 625 p.p.m. HCl.

Example 6

This example illustrates the preparation of a modified methylpolysiloxane resin by cohydrolysis and cocendensation of about 96.2 mole percent of methyltriethoxysilane and about 3.8 mole percent of monofunctional trimethylmethoxysilane.

MATERIALS USED 266.5 g. (1.5 moles) methyltriethoxysilane distilled from admixture with aqueous sodium carbonate;
6.8 (0.057 mole) trimethylethoxysilane containing, as received, 11 p.p.m. HCl;
55 g. (3.06 moles) distilled water;
7 drops 0.1 N HCl equals about 4 p.p.m. HCl total acidity adjusted for acidity expressed as HCl present in the trimethylethoxysilane reactant.

The silane reactant materials and water were weighed into a 500 ml. three-necked, round-bottomed flask provided with a stirrer and a condenser, which had a takeoff to allow for either reflux or distillation. The reaction mixture was heated with stirring over a period of 13 minutes to 80° C. During the next 7 minutes of heating and stirring, the mixture cleared and became cloudy twice, and then finally cleared. Stirring was continued, while holding the reaction mass at its reflux temperature (ca. 80° C.), for 4 hours. The liquid reaction product was then heated to distill off a total of 200 ml. of by-product ethanol, which corresponds to about 75% of the theoretical.

The concentrated liquid siloxane partial condensation product was precured by pouring it into a beaker, and heating with stirring to 140° C. over a period of about 20 minutes. It was held only momentarily at 140° C. During precuring some bubbling and a viscosity increase were noted.

Two samples were cast in aluminum-foil molds, such as were described in prior examples, and placed in a 90° C. oven for further cure. After heating in the oven for about 24 hours both samples were hard, clear and free from cracks. They were cooled, removed from the mold, inverted, and returned to the 90° C. oven for further cure. After heating in the 90° C. oven for an additional 72 hours, the samples were still hard, clear and free from cracks. Heating was then discontinued.

Example 7

MATERIALS USED 133.7 g. (0.75 mole) methyltriethoxysilane distilled from admixture with aqueous sodium carbonate;
4.3 g. (0.036 mole) dimethyldimethoxysilane distilled over lithium aluminum hydride; acidity, nil;
35 g. (1.94 moles) distilled water.

The same apparatus was used as described in Example 6. Sufficient 1 N HCl was added to the water before admixture so that there was present 5 parts of acid, expressed as HCl, per mlilion parts of total silane reactant material plus water.

The reaction mixture was heated to 80° C. in 12 minutes, and in another minute the mixture first clouded and then became clear to form a one-phase system. Heating under reflux (ca. 80° C.), while stirring the reaction mass, was continued for 4 hours, after which a total of 100 ml. of by-product ethanol was distilled off.

The distillation residue was precured with stirring to 140° C. and two samples of the precured liquid resin were finally cured in exactly the same manner as described in Example 6. As in that example, bubbling and an increase in viscosity were noted during the precuring step; and, also, both samples were hard, clear and free from cracks after heating in a 90° C. oven for 24 hours as well as after heating at this same oven temperature for an additional 72 hours.

The foregoing Example 7 illustrates the preparation of a modified methylpolysiloxane resin by cohydrolysis and cocondensation of about 95.3 mole percent of methyltriethoxysilane and about 4.7 mole percent of difunctional dimethyldimethoxysilane.

Example 8

A partially condensed methylypolysiloxane resin was prepared from methyltriethoxysilane by a procedure similar to that described in Example 1 using a reaction mixture containing 3 p.p.m. acid, expressed as HCl on the same basis as previously described, and a molar ratio of silane:water of 1:2.25, respectively. Precure was effected by heating the partial condensation product momentarily to about 160° C. The precured resin was dissolved in n-butanol to give a solution containing approximately 40 percent by weight of resin solids.

Coatings on aluminum and copper were then prepared by dipping cleaned metal panels in this n-butanol solution and curing for 30 minutes at 135° C. for a copper panel and 10 minutes at 175° C. for an aluminum panel. Hard, clear coatings were obtained in both cases. The coatings were about 0.5 mil thick. They survived 10% and 5% impact elongation (a measure of impact flexibility) for copper and aluminum, respectively.

The tests to determine the impact flexibility of the coatings were made with a G.E. impact flexibility tester. This instrument generally determines the relative flexibility of a paint, varnish or enamel film expressed as percentage elongation, in a range of from 0.5 to 60% as based on the impactof a solid metal cylinder dropped through a guide track from a height of 4 feet into the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

Example 9

The n-butanol solution of the precured resin described in Example 8 was also used to prepare glass cloth laminates by the following procedure:

Heat-cleaned, neutral pH, Style 181, Type E glass cloth was immersed in the resin solution so that it was completely impregnated. It was then air-dried for at least 2 hours. Fourteen squares, 7 in. x 7 in., were cut from the cloth and stacked one upon the other. The stack was placed between two steel plates, 8 in. x 8 in. x ⅛ in., and the resulting assembly was inserted in a press heated to 260° F. Slight pressure was applied until the resin gelled, and then 25,000 lbs. total pressure (corresponding to about 500 p.s.i.) was applied. The press temperature was maintained at 260° for another 30 minutes. The press wac cooled to 200° F., the laminate removed, and a post-cure of 24 hours at 135° C. was given.

The laminate contained about 30% by weight of resin and was about 0.1 in. thick. The flexural strength measured at room temperature was 36,000 p.s.i., while the tangent modulus at room temperature was $3.80 \times 10^6$ p.s.i.

It will be evident that modifications of this invention can be made without departing from the spirit and scope of this disclosure or the scope of the following claims.

What is claimed is:
1. The method of preparing an organopolysiloxane resin, which is capable of being further cured, by the steps of
  (I) heating a mixture of
    (A) a methyltrialkoxysilane represented by the general formula

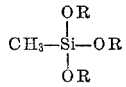

wherein R represents an alkyl radical containing less than 4 carbon atoms and from 0 to about 5 mole percent, based on the total silane reactant material, of at least one compound different from the above-described methyltrialkoxysilane and which is represented by the general formula

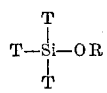

wherein R in the alkoxy radical —OR has the same meaning as in the first-given formula and each T independently represents an aryl, alkyl or alkenyl radical, each of which contains less than 7 carbon atoms, or the aforementioned alkoxy radical, —OR, and (B) from about 1.5 to 10 moles of water per mole of total silane reactant material, said mixture containing by weight from 0 to about 700 parts of acid, expressed as HCl, per million parts of total silane reactant material and water, said maximum of about 700 parts of acid being the approximate upper limit when using a silane: water mole ratio of 1:1.5 and decreasing to a maximum of 1 weight part of acid, expressed as HCl, per million parts of total silane reactant material and water when the silane:water mole ratio employed is 1:10, the heating of the said mixture to form a liquid siloxane partial condensation product being continued for from about 1 to 10 hours at temperatures of at least about 40° C. while retaining in said mixture at least 1.5 moles of alkanol by-product per mole of silane starting material assuming complete hydrolysis of all alkoxy-silicon linkages in the silane reactant material in the liquid reaction mixture;

(II) concentrating the liquid siloxane partial condensation product from Step I by gradually raising its temperature above its initial reaction temperature to a maximum temperature within the range of from 65° to 300° C. thereby to remove some but not all volatile material including alkanol by-product and water and to obtain a liquid residue; and (III) precuring the concentrated liquid siloxane partial condensation product from Step II by heating it at a temperature below is gelation point, and within the range of from 70° to 300° C., to remove the remainder of the volatile material and to obtain, without gelation, a more highly condensed, organic solvent-soluble, siloxane partial condensation product that is capable of being finally cured to a solid organopolysiloxane resin.

2. An organic solvent-soluble, siloxane partial condensation product resulting from the method of claim 1.

3. A coating composition comprising an organic solvent having dissolved therein the oragnic solvent-soluble, siloxane partial condensation product resulting from the method of claim 1, the amount of the said condensation product not exceeding 90 weight percent of the organic solvent solution thereof.

4. A coating composition as in claim 3 wherein the organic solvent is an organic water-miscible solvent, and the amount of the condensation product does not exceed about 50% by weight thereof.

5. A coating composition as in claim 4 wherein the organic water-miscible solvent is ethanol.

6. A coating composition as in claim 4 wherein the the organic water-miscible solvent is acetone.

7. The method as in claim 1 wherein the molar amount of water of B is from about 1.5 to 5 moles of water per mole of total silane reactant material.

8. The method as in claim 1 which includes the further step of finally curing the precured siloxane partial condensation product from Step III by initially heating it at a miximum temperature not exceeding about 90° C., the maximum temperature during this initial portion of the final-stage cure being below the particular maximum precuring temperature employed in Step III, and thereafter continuing the final-stage cure at the same temperature employed during the said initial portion of the final-stage cure, or at a higher or lower temperature, until curing has been completed and a solid organopolysiloxane resin has been obtained.

9. A method of preparing a resin by
(a) heating a mixture of a methyltrialkoxysilane of the formula

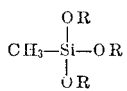

and 0 to about 5 mole percent, based on total silane reactants, of at least one compound different from the above-described methyltrialkoxysilane and which is represented by the general formula $(T)_n Si(OR)_{4-n}$ where $n$ is an integer from 1 to 3, T is an alkyl radical of less than seven carbon atoms and R is an alkyl radical of less than four carbon atoms, and from 1.5 to about 5 moles of water per mole of silane, for at least one hour and up to ten hours at temperatures of about 65° to 100° C. while retaining at least 1.5 moles of alkanol by-products in said mixture per mole of silane starting material assuming complete hydrolysis of all alkoxy-silicon linkages in the silane reactant material in the said mixture, and (b) gradually raising the temperature of the resultant mixture to a temperature of from 70° to 300° C. while removing by volatilization alkanol by-products and some water for a time short of gel formation in said temperature range and (c) heating the resultant resin at temperatures below those employed in Step (b) to a solid product.

10. A method of preparing solid resin by
(a) heating a mixture of a methyltrialkoxysilane of the formula

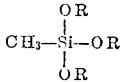

wherein R represents an alkyl radical of less than four carbon atoms, and from 1.5 to about 5 moles of water per mole of silane, for at least one hour and up to ten hours at temperatures of about 65° to 100° C. while retaining at least 1.5 moles of alkanol by-products in said mixture per mole of silane starting material assuming complete hydrolysis of all alkoxy-silcon linkages in the silane reactant material in said mixture, said mixture having an acid content up to about 650 parts of acid, expressed as HCl, per million parts of total methyltrialkoxysilane and water, to form a partial condensation product, (b) concentrating the condensation product by gradually rasing the temperature of the resultant mixture to a temperature of from 65° to 300° C. while gradually removing by volatilization alkanol by-products and some water, (c) precuring the concentrated partial condensation product for a time short of gel formation within a temperature range of about 100° to 300° C. and (d) heating the resultant precured condensation product at a temperature below that employed in Step (c) to a solid product.

11. In a method for making a solid organopolysiloxane resin by hydrolysis and condensation of alkoxysilanes and subsequent heat curing to a solid, the improvement which comprises (a) heating a mixture of a methltrialkoxysilane of the formula

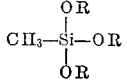

and 0 to about 5 mole percent, based on total silane reactants, of at least one compound of the formula $(T)_n Si(OR)_{4-n}$ where $n$ is an integer of from 2 to 3 T is an alkyl radical of less than seven carbon atoms, and R is an alkyl radical of less than four carbon atoms, and from 1.5 to about 5 moles of water per mole of silane, for at least on hour and up to ten hours at temperatures of about 65° to 100° C., while retaining at least 1.5 moles of alkanol by-products in said mixture per mole of silane starting material assuming complete hydrolysis of all alkoxy-silicon linkages in the silane reactant material in the said mixture, and (b) raising the temperature of the resultant mixture to a final temperature of from 70° to 300° C. while removing by volatilization alkanol by-products and some water for a time short of gel formation in said temperature range.

12. A method of preparing a polymer comprising reacting methyltriethoxysilane at a temperature of about 80° C. in water using about 2½ moles of water per mole of said silane by refluxing said silane and water for at least about one hour in the presence of about 2 parts of acid, expressed as HCl, per million parts of said silane and water, concentrating the refluxed material at about 65° to 300° C., heating the resultant concentrated material at 140° C. for about one minute, casting said material, and thereafter heating the cast material at about 90° C. to provide a hard clear polysiloxane.

13. A product produced by the process defined in claim 8.

14. The method as defined in claim 1 wherein the methyltrialkoxysilane is methyltriethoxysilane, and any other silane reactant material is at least one compound represented by the general formula $(CH_3)_nSi(OC_2H_5)_{4-n}$ where $n$ is 2 or 3 and the upper limit of acid, expressed as HCl, is about 650 parts per million parts of total silane reactant material and water.

15. The method as defined in claim 1 in which the molar amount of water of B is from about 1.5 to 5 moles of water per mole of total reactant material, and which includes the further step of finally curing the precured siloxane partial condensation product from Step III by initially curing it at a maximum temperature not exceeding about 90° C., the maximum temperature during this initial portion of the final-stage cure being below the particular maximum precuring temperature employed in Step III, and thereafter continuing the final-stage cure at the same temperature employed during said initial portion of the final-stage cure, or at a higher or lower temperature, until curing has been completed and a solid organopolysiloxane resin has been obtained.

16. The method as in claim 1 wherein the molar amount of water of B is from 1.5 to about 5 moles of water per mole of total silane reactant material, and wherein the precured liquid siloxane partial condensation product from Step III is advanced in cure at a temperature not exceeding about 90° C. to a firm, solid organopolysiloxane that is capable of being further cured.

17. A method as defined in claim 1 in which the methyltrialkoxysilane is methyltriethoxysilane.

18. A method as defined in claim 1 in which the precuring temperature in Step III is about 110° to 300° C.

References Cited
UNITED STATES PATENTS 3,304,318   2/1967   Brady _____ 260—46.5

DONALD E. CZAJA, *Primary Examiner.*

M. I. MARQUIS, *Assistant Examiner.*